US012602615B2

(12) United States Patent
de Sousa et al.

(10) Patent No.: US 12,602,615 B2
(45) Date of Patent: Apr. 14, 2026

(54) EVALUATION OF MACHINE LEARNING MODELS USING AGREEMENT SCORES

(71) Applicant: Dell Products L.P., Round Rock, TX (US)

(72) Inventors: Iam Palatnik de Sousa, Rio de Janeiro (BR); Werner Spolidoro Freund, Rio de Janeiro (BR); João Victor da Fonseca Pinto, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 653 days.

(21) Appl. No.: 17/979,369

(22) Filed: Nov. 2, 2022

(65) Prior Publication Data

US 2024/0144080 A1 May 2, 2024

(51) Int. Cl.
*G06N 20/00* (2019.01)
(52) U.S. Cl.
CPC ................................... *G06N 20/00* (2019.01)
(58) Field of Classification Search
CPC ..................................................... G06N 20/00
See application file for complete search history.

(56) References Cited

U.S. PATENT DOCUMENTS

2021/0209499 A1* 7/2021 Mishraky ................ G06N 20/00
2022/0121885 A1* 4/2022 Chalamalasetti ....... G06F 17/18

OTHER PUBLICATIONS

Barclay,et al.; "Quantifying Transparency of Machine Learning Systems Through Analysis of Contributions." arXiv preprint arXiv:1907. 03483 (2019).
Gebru et al.; "Datasheets for Datasets." Communications of the ACM 64, No. 12 (2021): 86-92.
Mitchell et al.; "Model Cards for Model Reporting." In Proceedings of the conference on fairness, accountability, and transparency, pp. 220-229. 2019.
"MLflow, An Open-Source Platform for the Machine Learning Lifecycle"; Available at: https://mlflow.org/.

* cited by examiner

*Primary Examiner* — Eric Nilsson
(74) *Attorney, Agent, or Firm* — Ryan, Mason & Lewis, LLP

(57) ABSTRACT

Techniques are provided for evaluation of machine learning models using agreement scores. One method comprises obtaining two or more of: (i) a first set of quantitative features characterizing model parameters of a machine learning model; (ii) a second set of quantitative features characterizing a training process used to train the machine learning model; and (iii) a third set of quantitative features characterizing a training dataset used to train the machine learning model; generating a score based on an aggregation of at least portions of the two or more of the first set, the second set and the third set, wherein the score is based on an agreement of the machine learning with designated characteristics; and initiating an automated action based on the score. The automated action may comprise updating the machine learning model; generating a notification in connection with an audit; and/or selecting a machine learning model for deployment.

20 Claims, 6 Drawing Sheets

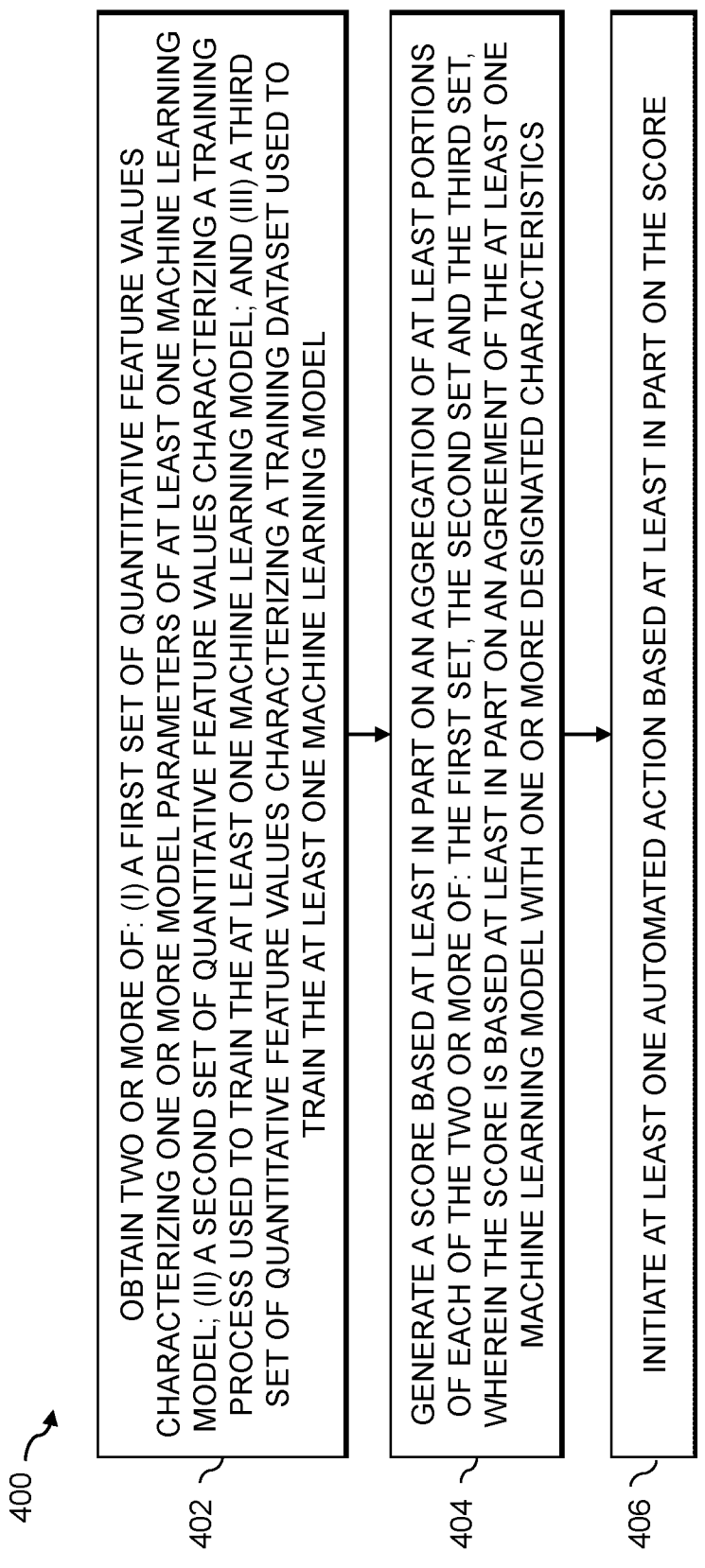

400

402 OBTAIN TWO OR MORE OF: (I) A FIRST SET OF QUANTITATIVE FEATURE VALUES CHARACTERIZING ONE OR MORE MODEL PARAMETERS OF AT LEAST ONE MACHINE LEARNING MODEL; (II) A SECOND SET OF QUANTITATIVE FEATURE VALUES CHARACTERIZING A TRAINING PROCESS USED TO TRAIN THE AT LEAST ONE MACHINE LEARNING MODEL; AND (III) A THIRD SET OF QUANTITATIVE FEATURE VALUES CHARACTERIZING A TRAINING DATASET USED TO TRAIN THE AT LEAST ONE MACHINE LEARNING MODEL

404 GENERATE A SCORE BASED AT LEAST IN PART ON AN AGGREGATION OF AT LEAST PORTIONS OF EACH OF THE TWO OR MORE OF: THE FIRST SET, THE SECOND SET AND THE THIRD SET, WHEREIN THE SCORE IS BASED AT LEAST IN PART ON AN AGREEMENT OF THE AT LEAST ONE MACHINE LEARNING MODEL WITH ONE OR MORE DESIGNATED CHARACTERISTICS

406 INITIATE AT LEAST ONE AUTOMATED ACTION BASED AT LEAST IN PART ON THE SCORE

FIG. 4

EVALUATION OF MACHINE LEARNING MODELS USING AGREEMENT SCORES

FIELD

The field relates generally to information processing systems, and more particularly to machine learning models used by such information processing systems.

BACKGROUND

Machine learning models are increasingly employed in various settings within companies and other businesses. Such models may be used to review resumes, for example, as part of a recruitment process, as well as for cybersecurity threat detection, facial recognition and other potentially sensitive and important tasks. There have been increasing concerns regarding the safety, transparency and/or reliability of such machine learning models, and in ensuring that such machine learning models can be reliably deployed.

SUMMARY

In one embodiment, a method comprises obtaining two or more of: (i) a first set comprising one or more first quantitative feature values characterizing one or more model parameters of at least one machine learning model; (ii) a second set comprising one or more second quantitative feature values characterizing a training process used to train the at least one machine learning model; and (iii) a third set comprising one or more third quantitative feature values characterizing a training dataset used to train the at least one machine learning model; generating a score based at least in part on an aggregation of at least portions of each of the two or more of: the first set, the second set and the third set, wherein the score is based at least in part on an agreement of the at least one machine learning model with one or more designated characteristics; and initiating at least one automated action based at least in part on the score.

In some embodiments, the one or more first quantitative feature values characterizing the one or more model parameters of the at least one machine learning model comprise one or more of: (i) a numeric adjustment to the score based at least in part on a degree of transparency of the at least one machine learning model for each of a plurality of different designated groupings of machine learning models; (ii) a numeric adjustment to the score based at least in part on whether the at least one machine learning model was deployed for a given task without incurring one or more designated bias issues; (iii) a numeric adjustment to the score based at least in part on whether the at least one machine learning model was previously at least partially trained using third-party data that is not accessible; and (iv) a numeric adjustment to the score based at least in part on whether the at least one machine learning model was developed at least partially by a third-party entity.

In one or more embodiments, the one or more second quantitative feature values characterizing the training process used to train the at least one machine learning model comprise one or more of: (i) a performance value of the at least one machine learning model following the training process; (ii) an overfit value characterizing a difference in: (a) a performance of the at least one machine learning model with respect to the training dataset and (b) a performance of the at least one machine learning model with respect to a testing dataset; and (iii) a numeric adjustment to the score for at least one of a plurality of different regularization techniques used by the training process.

In at least one embodiment, the one or more third quantitative feature values characterizing the training dataset used to train the at least one machine learning model comprise one or more of: (i) a balance value calculated using at least one designated balance metric that characterizes a degree of balance of the training dataset used to train the at least one machine learning model; (ii) a numeric adjustment to the score based on a presence of one or more personal human characteristics in the training dataset used to train the at least one machine learning model; and (iii) a numeric adjustment to the score based on an indication that at least a portion of the training dataset used to train the at least one machine learning model was obtained using an automated data mining technique.

In some embodiments, the at least one automated action may comprise initiating a generation of one or more updates to at least a portion of the at least one machine learning model based at least in part on the score. The one or more updates may be directed to at least a given one of the one or more model parameters, the training process and the training dataset of the at least one machine learning model based at least in part on an evaluation of a portion of the score generated from a corresponding one of the first quantitative feature values, the second quantitative feature values and the third quantitative feature values. The at least one automated action may also comprise (i) generating at least one notification in connection with at least one audit of the at least one machine learning model; and/or selecting a given one of a plurality of machine learning models for deployment based at least in part on the respective score.

Other illustrative embodiments include, without limitation, apparatus, systems, methods and computer program products comprising processor-readable storage media.

BRIEF DESCRIPTION OF THE DRAWINGS

FIG. 4 is a flow chart illustrating an exemplary implementation of a process for evaluation of machine learning models using agreement scores in accordance with an illustrative embodiment;

DETAILED DESCRIPTION

Figure 1:
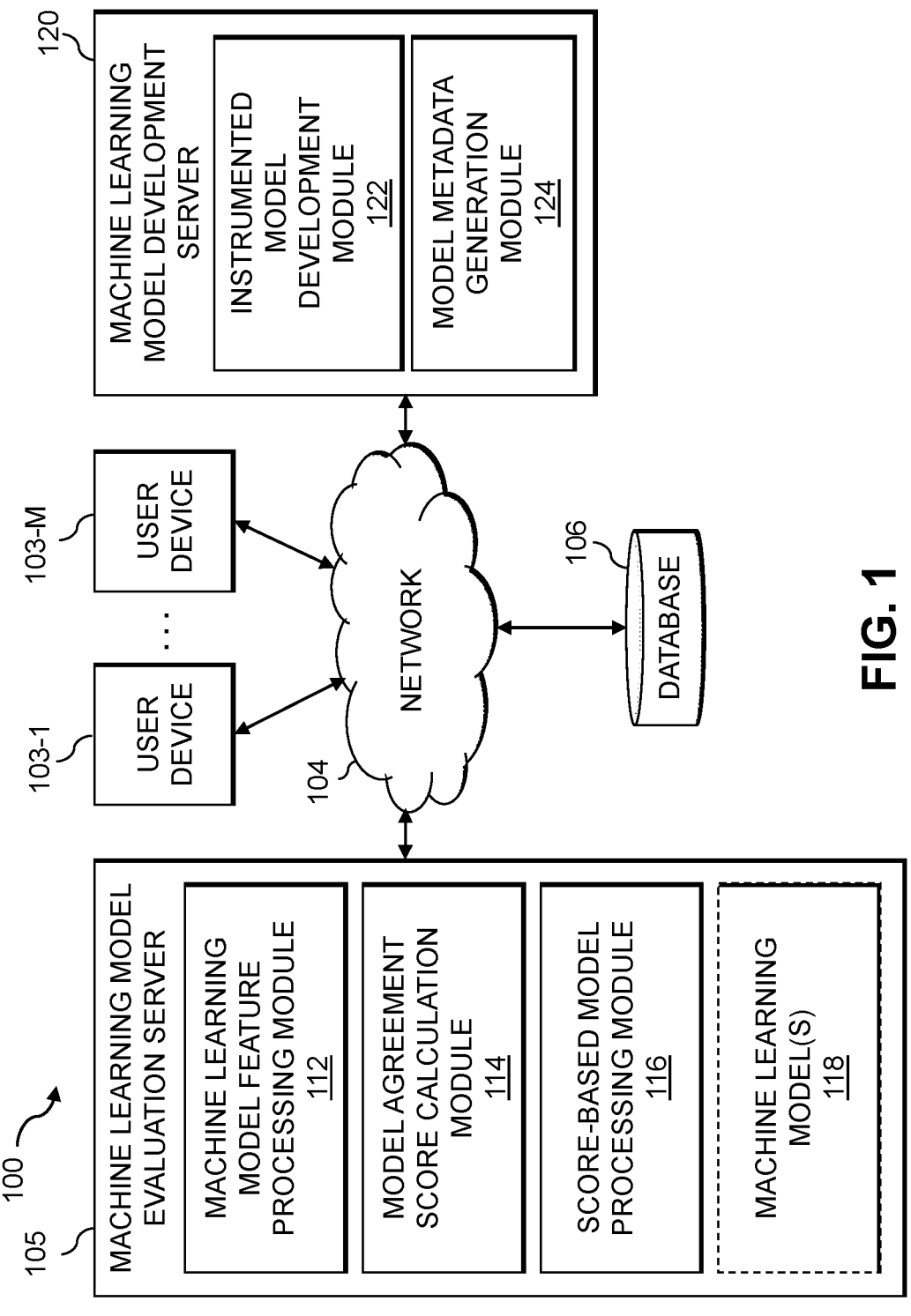
FIG. 1 illustrates an information processing system configured for evaluation of machine learning models using agreement scores in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for evaluation of machine learning models using agreement scores.

As noted above, machine learning models are increasingly employed in various settings within companies and other businesses. A machine learning model may be characterized, for example, by methodologies related to model selection, model training and training dataset construction. The choices made in association with these model development tasks may significantly influence a performance of the resulting model, as well as the ability of a given model to generalize to previously unseen data.

In one or more embodiments, the disclosed techniques for evaluation of machine learning models using agreement scores compute a model agreement score indicating an agreement of a given machine learning model with one or more designated characteristics, such as transparency characteristics, as discussed further below in conjunction with FIG. 3. The one or more designated characteristics may express, for example, best and/or preferred practices with respect to model development and particularly with respect to model parameters, the training process and/or the training dataset. The term "agreement score" as used herein shall be broadly construed to encompass any score based on a quantitative assessment of one or more designated features of a given machine learning model, as would be apparent to a person of ordinary skill in the art.

Unexpected behaviors of a particular machine learning model may comprise, for example, (i) performance fluctuations due to data drift, whereby a model is deployed on data distributions different from those used to train the particular machine learning model, and thus fail to generalize; (ii) manipulations of machine learning models pre-trained on data that included a selection bias or another poisoning of the training data; (iii) biased machine learning models that rely on sensitive data features such as gender, age or ethnicity; and (iv) black box machine learning models that make opaque but high-impact decisions regarding, for example, cybersecurity matters, such as detection and mitigation of threats, and that might expose a given company to adversaries or other malicious actors.

The generated model agreement score for a given machine learning model may be used in some embodiments to provide a compliance and auditing mechanism that can reduce unexpected model behaviors, and/or in a feedback manner to update one or more aspects of the given machine learning model (such as model selection, model training and/or training dataset construction aspects). In some embodiments, the model agreement score provides a quantitative, objective score, whereby a compliance of the given machine learning model to a number of transparency requirements, for example, is quantified before deployment. In this manner, a more controlled and transparent commissioning of models can be provided. The objective property of the provided model agreement score may be achieved in some embodiments using defined rules and/or programs to compute the model agreement score based on designated quantitative measures.

Among other benefits, the disclosed techniques for evaluation of machine learning models using agreement scores may be employed to detect unexpected behavior of a given model before such model is deployed. In this manner, the impact of such unexpected behavior can be reduced or prevented before further damage, loss and/or expense is incurred. One or more aspects of the disclosure thus identify and mitigate potential model issues before deployment of a given model, through analysis of various aspects of the given model.

In one or more embodiments, designated information is utilized regarding a given model, including training procedures and training data associated with the given model, in order to evaluate the given model for deployment, for example. A quantification in at least some embodiments of the disclosure is implemented as an agreement score (sometimes referred to as an objective compliance score). The agreement score may be based, at least in part, in some embodiments on objective, quantitative metrics that can be derived from the model, training process and/or associated training data in an automated manner.

In some embodiments, machine learning models may be commissioned for tasks of various risk levels by establishing appropriate thresholds using the objective compliance score, without necessarily requiring human qualitative judgement. For example, a malware detection model might have a higher agreement score requirement for deployment than a text-to-speech model for composing emails, within a particular company, for a particular use case.

Consider a department, team or individual, for example, that wishes to commission a machine learning model for a given use case within an organization. The organization may wish to quantify potential issues created by the commissioned machine learning model, if any, prior to a deployment of the model. In a typical development scenario, there are often multiple available models to choose from for a particular task, and the organization may wish to have a sorted list of the most applicable, reliable, safe and/or transparent models for the particular task.

One or more aspects of the disclosure recognize that quantifying such potential issues prior to the deployment of such a model may be a challenging task and may benefit from information pertaining to model development, such as development choices related to selection and generation of a training process and a training dataset for a particular machine learning model.

Machine learning models may be described in terms of their architectures. For deep neural networks, for example, the model description may include a number of layers, input and output shapes and activation functions used in a given deep neural network. Similarly, for decision trees, the model description may include, for example, the depth of the decision tree and/or a number of nodes in the decision tree. For other types of machine learning models, descriptions vary accordingly, as would be apparent to a person of ordinary skill in the art.

In addition, the subsequent behavior of a given machine learning model may also be influenced by the training procedure used to train the given model. Thus, information characterizing the training procedure may provide additional insight into whether the given model, upon deployment, may incur biased behavior or other unexpected or undesirable behavior. Such information characterizing the training procedure may comprise, for example, training process features related to data augmentation, loss weighing, test time augmentation, early stopping criteria, cross-validation, dropout, use of ensemble models, bootstrapping and other types of data regularizations. Using such training process techniques may make a model more robust against various biases compared to models that do not use such training techniques, for example. If a particular model had one or more data regularization techniques employed during the training of the particular model, it may be inferred that the particular model is more (or less) vulnerable to data drift or poor performance when presented with new data that is different than the test dataset.

Further, in order to determine whether a given machine learning model, upon deployment, may incur biased behavior, one or more aspects of the disclosure recognize that it may be important to characterize one or more data selection criteria used to establish the training dataset and/or the testing dataset (collectively referred to herein as training data unless otherwise noted). Among potential concerns regarding training data, a non-exhaustive and non-limiting list includes: understanding whether a given dataset is imbalanced and the approaches that were chosen to deal with such imbalances (e.g., oversampling and/or undersampling); whether the data comprises private or public data; whether the dataset is maintained with regular updates and how such training data was derived, as discussed further below.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more machine learning model evaluation servers 105, one or more machine learning model development servers 120 and one or more databases 106, discussed below.

The user devices 103 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary machine learning model evaluation server 105 may comprise a machine learning model feature processing module 112, a model agreement score calculation module 114, a score-based model processing module 116 and one or more machine learning models 118. In some embodiments, the machine learning model feature processing module 112 generates feature values for a number of features of the one or more machine learning models 118, as discussed further below in conjunction with FIG. 2, for example. In one variation, the machine learning model feature processing module 112 may be implemented in the machine learning model development server 120 to generate the feature values for a given machine learning model during the development of the given machine learning model. The model agreement score calculation module 114 processes at least some of the feature values generated by the machine learning model feature processing module 112 to determine an aggregate score, as discussed further below in conjunction with FIG. 2, for example. The score-based model processing module 116 performs one or more automated actions based at least in part on the aggregate score.

It is to be appreciated that this particular arrangement of elements 112, 114, 116, 118 illustrated in the machine learning model evaluation server 105 of the FIG. 1 embodiment is presented by way of example only, and alternative arrangements can be used in other embodiments. For example, the functionality associated with elements 112, 114, 116, 118 in other embodiments can be combined into a single element, or separated across a larger number of elements. As another example, multiple distinct processors can be used to implement different ones of elements 112, 114, 116, 118 or portions thereof.

At least portions of elements 112, 114, 116, 118 may be implemented at least in part in the form of software that is stored in memory and executed by a processor. An exemplary process utilizing elements 112, 114, 116, 118 of the machine learning model evaluation server 105 in computer network 100 will be described in more detail with reference to FIGS. 2 through 4.

Other machine learning model evaluation servers 105 (not shown in FIG. 1), if any, are assumed to be configured in a manner similar to that shown for machine learning model evaluation server 105 in the figure.

As shown in FIG. 1, an exemplary machine learning model development server 120 may comprise an instrumented model development module 122 and a model metadata generation module 124. The machine learning model development server 120 may be instrumented to record decisions or choices made by a developer, for example, during a development of a particular machine learning model and other model development information, such as model parameters, model code versions, model metrics, and output files when executing machine learning code. For example, if a developer chooses to implement a given machine learning model as a random forest having certain parameters, such parameters may be recorded for later use, for example, in connection with the disclosed techniques for evaluation of machine learning models using agreement scores. The machine learning model development server 120 may be implemented, for example, using the MLflow open-source development platform.

In some embodiments, the instrumented model development module 122 may record selections and/or choices made by a model developer during the development of a given machine learning model. The model metadata generation module 124 may record the selections and/or choices made by the model developer, as recorded by the instrumented model development module 122, as metadata associated with the given machine learning model.

It is to be appreciated that this particular arrangement of modules 122, 124 illustrated in the machine learning model development server 120 of the FIG. 1 embodiment is presented by way of example only, and alternative arrangements can be used in other embodiments. For example, the functionality associated with modules 122, 124 in other embodiments can be combined into a single element, or separated across a larger number of elements. As another example, multiple distinct processors can be used to implement different ones of modules 122, 124 or portions thereof.

At least portions of modules 122, 124 may be implemented at least in part in the form of software that is stored in memory and executed by a processor. An exemplary process utilizing modules 122, 124 of the machine learning model development server 120 in computer network 100 will be described in more detail with reference to FIGS. 2 through 4.

Other machine learning model development servers 120 (not shown in FIG. 1), if any, are assumed to be configured in a manner similar to that shown for machine learning model development server 120 in the figure.

The machine learning model evaluation server 105 and/or the machine learning model development server 120 may be implemented, for example, on the cloud, such as a private cloud, or on the premises of an enterprise or another entity. In some embodiments, the machine learning model evaluation server 105 and/or the machine learning model development server 120, or portions thereof, may be implemented as part of a host device.

Additionally, the machine learning model evaluation server 105 and/or the machine learning model development server 120 can have an associated database 106 configured to store, for example, model information, such as one or more machine learning models in a machine learning model library, model metadata, such as model parameters, information characterizing a training dataset, and information characterizing a test dataset, as well as instrumentation data from the machine learning model development server 120.

In this manner, the machine learning model feature processing module 112 can generate feature values by directly evaluating the one or more machine learning models and/or the additional model information, such as (i) the metadata characterizing the model, training dataset and/or test dataset and (ii) the instrumentation data from the machine learning model development server 120.

At least portions of the database 106 configured to store the model information may be implemented, for example, using a vault or another memory provided by an operating system of one or more of the user devices 103, machine learning model evaluation servers 105, and/or machine learning model development servers 120.

The database 106 in the present embodiment is implemented using one or more storage systems associated with the machine learning model development server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more user devices 103, machine learning model evaluation servers 105, and/or machine learning model development servers 120 may be implemented on a common processing platform, or on separate processing platforms. The one or more user devices 103 and/or machine learning model evaluation servers 105 may be configured to interact over the network 104 in at least some embodiments with the machine learning model development server 120, for example.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103, machine learning model evaluation servers 105, and/or machine learning model development servers 120 to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more user devices 103, machine learning model evaluation servers 105, and/or machine learning model development servers 120 can be one or more input-output devices (not shown), which illustratively comprise keyboards, displays or other types of input-output devices in any combination. Such input-output devices can be used, for example, to support one or more user interfaces to the machine learning model development server 120, as well as to support communication between the machine learning model development server 120 and other related systems and devices not explicitly shown.

The one or more user devices 103, machine learning model evaluation servers 105, and/or machine learning model development servers 120 in the FIG. 1 embodiment are assumed to be implemented using at least one processing device. Each such processing device generally comprises at least one processor and an associated memory, and implements one or more functional modules for controlling certain features of the respective device.

More particularly, the one or more user devices 103, machine learning model evaluation servers 105, and/or machine learning model development servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more user devices 103, machine learning model evaluation servers 105, and/or machine learning model development servers 120 to communicate in some embodiments over the network 104 with each other (as well as one or more other networked devices), and illustratively comprises one or more conventional transceivers.

It is to be understood that the particular set of elements shown in FIG. 1 for evaluation of machine learning models using agreement scores is presented by way of illustrative example only, and in other embodiments additional or alternative elements may be used. Thus, another embodiment includes additional or alternative systems, devices and other network entities, as well as different arrangements of modules and other components.

Figure 2:
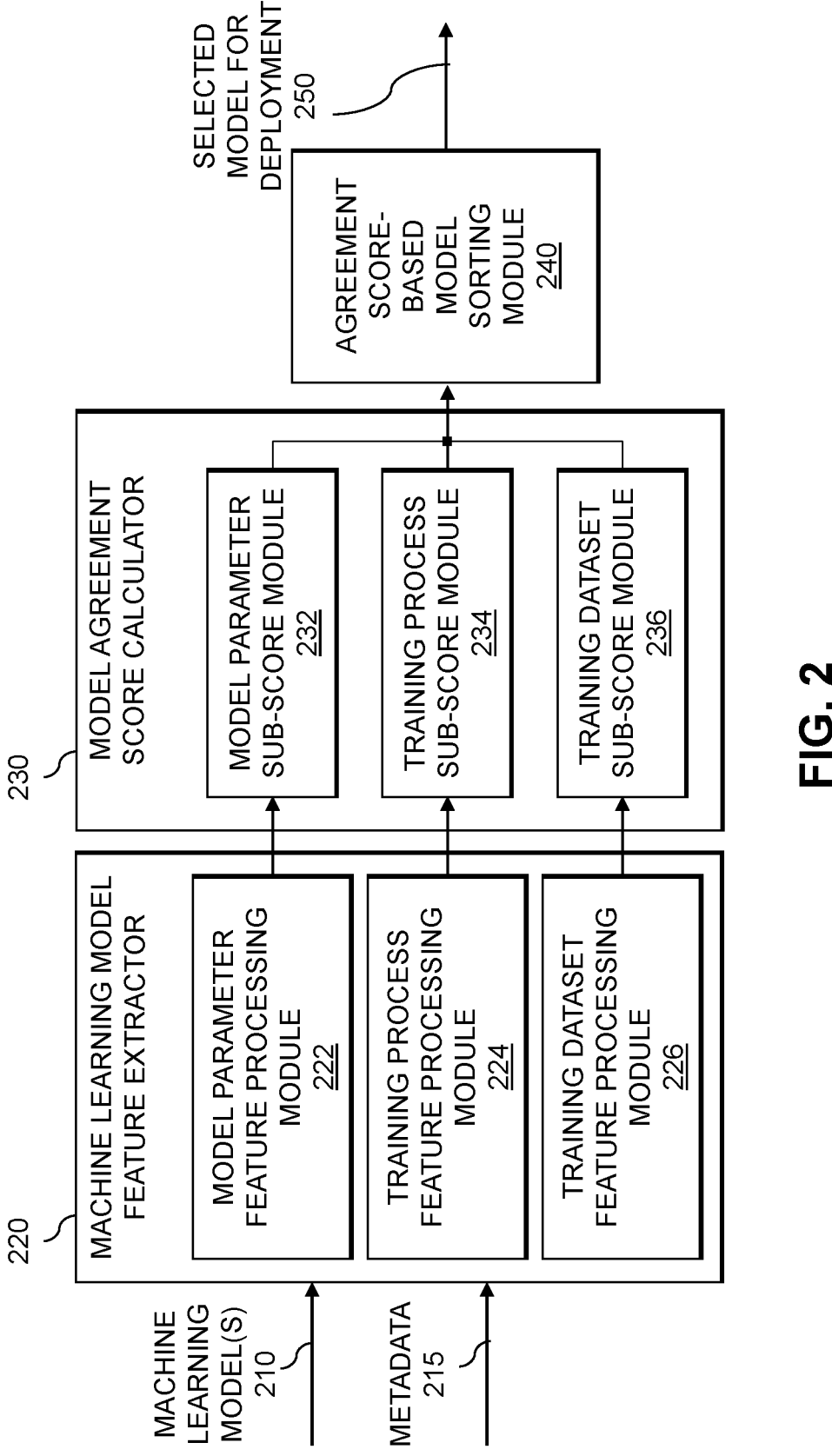
FIG. 2 illustrates a score-based selection of machine learning models in accordance with an illustrative embodiment.

FIG. 2 illustrates a score-based selection of machine learning models in accordance with an illustrative embodiment. In the example of FIG. 2, one or more machine learning models 210 (e.g., from a library of candidate machine learning models) and/or metadata 215 corresponding to such one or more machine learning models 210 may be processed by a machine learning model feature extractor 220. In various embodiments, the metadata 215 may comprise metadata related to the one or more machine learning models 210, as well as metadata related to the training processes and training datasets associated with the corresponding one or more machine learning models 210.

As shown in FIG. 2, the machine learning model feature extractor 220 may comprise a model parameter feature processing module 222, a training process feature processing module 224 and a training dataset feature processing module 226. In some embodiments, the model parameter feature processing module 222 may generate feature values for a number of designated model parameter features of the one or more machine learning models 210, as discussed further below. The training process feature processing module 224 may generate feature values for a number of training process features of the one or more machine learning models 210. The training dataset feature processing module 226 may generate feature values for a number of training dataset features of the one or more machine learning models 210. The model parameter features, training process features and/or training dataset features may comprise numerical, categorical and/or nominal features that are transformed into numerical feature values by the respective feature processing modules 222, 224, 226.

A model agreement score calculator 230 may comprise a model parameter sub-score module 232, a training process sub-score module 234 and a training dataset sub-score module 236. In one or more embodiments, the model parameter sub-score module 232 may process the feature values for the designated model parameter features, generated by the model parameter feature processing module 222, to calculate a model parameter sub-score. The training process sub-score module 234 may process the feature values for the designated training process features, generated by the training process feature processing module 224, to calculate a training process sub-score. The training dataset sub-score module 236 may process the feature values for the designated training dataset features, generated by the training dataset feature processing module 226, to calculate a training dataset sub-score. The generation of the model parameter sub-score, the training process sub-score and the training dataset sub-score is discussed further below.

The model agreement score calculator 230 may aggregate the model parameter sub-score, training process sub-score and training dataset sub-score (for example, using a weighted sum) to generate an agreement score, as discussed further below. The agreement score may indicate an agreement of the machine learning model with one or more designated characteristics, discussed below.

It is to be appreciated that this particular arrangement of modules 222, 224, 226 illustrated in the machine learning model feature extractor 220 and/or modules 232, 234, 236 illustrated in the model agreement score calculator 230 of the FIG. 2 embodiment is presented by way of example only, and alternative arrangements can be used in other embodiments. For example, the functionality associated with modules 222, 224, 226 and/or modules 232, 234, 236 in other embodiments can be combined into a single element, or separated across a larger number of elements. As another example, multiple distinct processors can be used to implement different ones of modules 222, 224, 226 and/or modules 232, 234, 236 or portions thereof.

At least portions of modules 222, 224, 226 and/or modules 232, 234, 236 may be implemented at least in part in the form of software that is stored in memory and executed by a processor. An exemplary process utilizing modules 222, 224, 226 and/or modules 232, 234, 236 of the machine learning model feature extractor 220 and the model agreement score calculator 230, respectively, in computer network 100 will be described in more detail with reference to FIGS. 3 and 4.

In some embodiments, the aggregate agreement score generated by the model agreement score calculator 230 may be sorted by an agreement score-based model sorting module 240, for example, to provide a ranked list of the one or more machine learning models 210. The agreement score-based model sorting module 240 may optionally filter the machine learning models 210 that are eligible for deployment, for example, based on an agreement score threshold, as would be apparent to a person of ordinary skill in the art. In addition, one of the machine learning models 210 may be a selected model 250 for deployment.

The information collected to evaluate the model parameter features, the training process features and/or the training dataset features, such as information obtained from an evaluation of a given machine learning model itself, and/or from the corresponding metadata and instrumentation data, is used to score the given machine learning model. In one or more embodiments, a quantitative, objective metric is provided, referred to as an agreement score or an objective compliance score, may be expressed as follows:

$$OCS=g(d,m,t),$$

where the variables d, m and t are the set of training dataset features describing one or more characteristics of the training data, the set of model parameter features describing one or more characteristics of the model, and the set of training process features describing one or more characteristics of the training process, respectively.

A precise form of g, d, m and t is specific to the needs of each organization or individual, and defining such precise forms is outside the scope of the present disclosure, as would be apparent to a person of ordinary skill in the art. In some embodiments, the function g is expressed using objective quantities that are automatically derivable from existing information related to the development of a given machine learning model.

Consider a particular compound form of g with each subfunction $g_i$ taking a single feature as input $f_i$, i.e.

$$\hat{g}(d,m,t)=\Sigma_i g_i(f_i),$$

where $f \in d \cup m \cup t$. In one or more embodiments, the various features processed by the $\hat{g}$ function may be expressed as described below. The sub-scores, discussed further below, for each model are then summed in some embodiments to generate an aggregate agreement score. The sub-scores may be normalized to specific ranges and/or multiplied by different weights in various implementations.

For the training process features t processed by the training process feature processing module 224, the following representative training process features t may be considered:

1. a training performance feature, which may be expressed using one or more of the following performance metrics:
    a. training accuracy (e.g., how many observations were correctly classified) can be expressed with the function $g_i: \mathcal{R} \rightarrow [0,1]$ having a 0 to 1 range with 1 indicating the best performance and 0 otherwise, for example;
    b. training F1-score (e.g., having a 0 to 1 scale) or another statistical measure that rates model performance; and/or
    c. training area under the curve (AUC) that characterizes a tradeoff between a true positive rate (TPR) and a false positive rate (FPR) (e.g., having a 0 to 1 scale);
2. a model overfitting feature that characterizes whether the model overfits the training dataset (e.g., when the model performs well on the training data but does not perform well on the test data), and by how much (e.g., having a 0 to −1 scale, based on a difference between training/testing performances, where 0 indicates no overfitting, for example); and/or
3. a model regularization feature characterizing zero or more regularization techniques applied during the model training to reduce unexpected behavior of the model:
    a. a dropout technique (adds +0.1 to the training process sub-score);
    b. a data augmentation (adds +0.1 to the training process sub-score);
    c. one or more early stopping criteria (adds +0.1 to the training process sub-score);

d. an L2 regularization (adds +0.1 to the training process sub-score); and/or
e. an L1 regularization (adds +0.1 to the training process sub-score).

For the training dataset features d employed by the training dataset feature processing module 226, the following representative training dataset features d may be considered:

1. a training dataset feature characterizing a degree of balance of the training data (e.g., having a 0 to 1 scale, and calculated, for example, using Shannon Entropy as a metric of balance) using one or more of the following performance metrics, and where a given dataset is imbalanced, whether measures were taken to mitigate such imbalance (adds +0.5 to training dataset sub-score if yes, 0 if no);
2. a sensitive training dataset feature indicating whether the data comprises sensitive features (e.g., from an ethics standpoint), such as gender, age, ethnicity or other private information) (adds −1 to training dataset sub-score); and/or
3. a data mining training dataset feature indicating whether the dataset was automatically mined without human supervision (adds −1 to training dataset sub-score, and has a 0 to 1 scale if there was such data mining, based on the percentage of the data that was later verified by a human).

For the model parameter features m employed by the training dataset feature processing module 226, the following representative model parameter features m may be considered:

1. a model transparency feature, which may be expressed using one or more of the following metrics:
    a. a first grouping of fully transparent models: e.g., expert rules and decision trees (adds +2 to the model parameter sub-score);
    b. a second grouping of models transparent at a global feature importance level: e.g., random forest models, boosted trees, and linear models (adds +1 to the model parameter sub-score); and/or
    c. a third grouping of fully opaque models: e.g., neural networks and deep learning ensemble models (adds +0 to the model parameter sub-score);
2. a model success feature indicating whether such an architecture was previously successfully employed for a similar task without a bias issue (adds +1 to the model parameter sub-score);
3. a model pre-training feature indicating whether the model was pre-trained using third-party data that is now inaccessible (adds −1 to the model parameter sub-score); and/or
4. a model intra-entity development feature indicating whether a given model was developed within the same organization deploying the given model (adds +1 to the model parameter sub-score).

Figure 3:
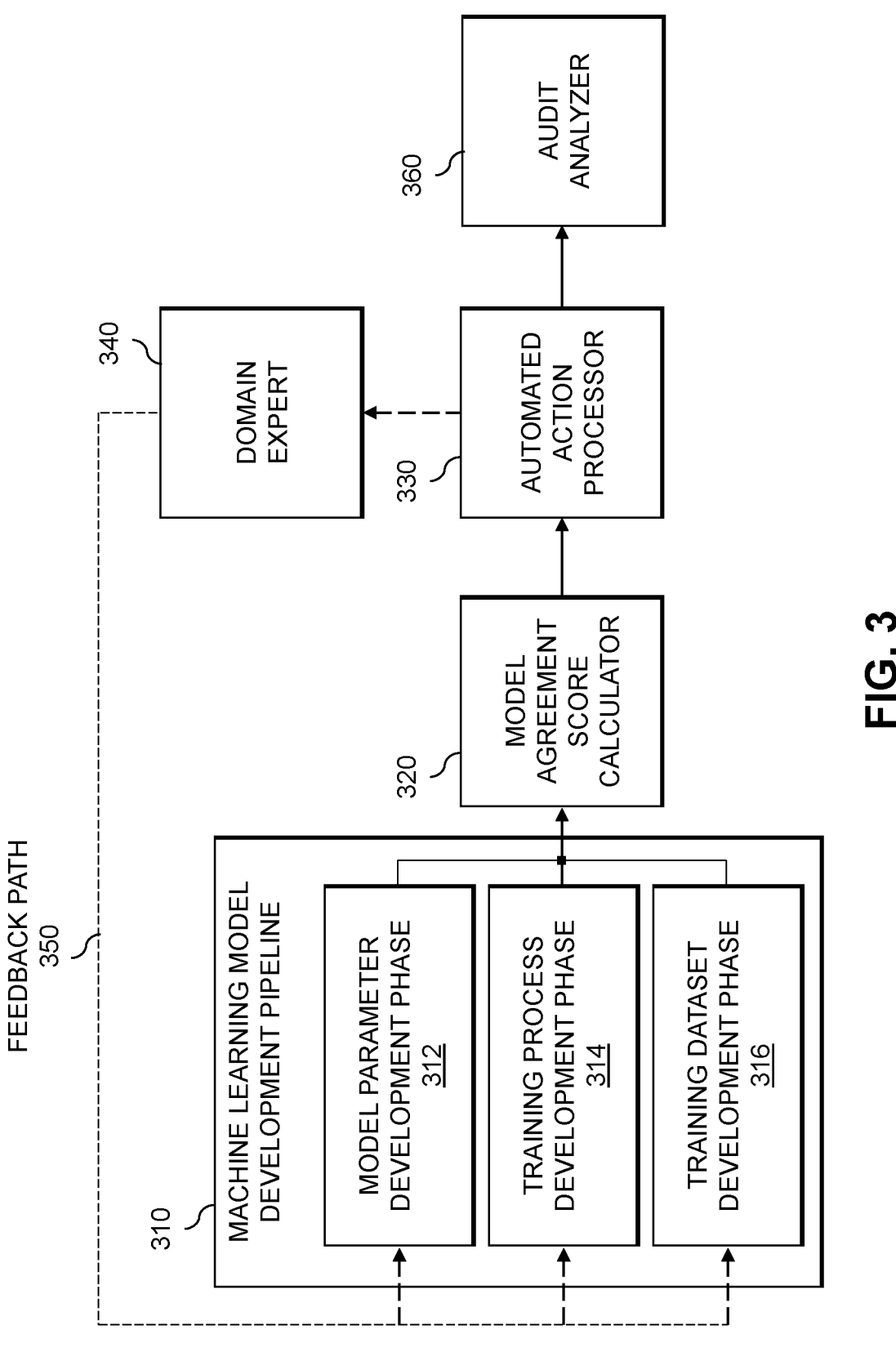
FIG. 3 illustrates a score-based processing of one or more machine learning models in accordance with an illustrative embodiment.

FIG. 3 illustrates a score-based processing of one or more machine learning models in accordance with an illustrative embodiment. In the example of FIG. 3, a machine learning model development pipeline 310 may comprise a model parameter development phase 312, a training process development phase 314 and a training dataset development phase 316. The model parameter development phase 312 may define one or more model parameters of a given machine learning model. The training process development phase 314 may define a training process to be utilized to train the given machine learning model. The training dataset development phase 316 may define and/or obtain a training dataset to be utilized to train the given machine learning model.

In some embodiments, a model developed using the machine learning model development pipeline 310 may be applied to a model agreement score calculator 320 that may generate a model agreement score in the manner described above in conjunction with FIG. 2, for example.

In addition, an automated action processor 330 may perform at least one automated action based at least in part on the model agreement score generated by the model agreement score calculator 320 for a given model. In one embodiment, the automated action may comprise generating one or more updates to at least a portion of the given machine learning model based on the score. A domain expert 340, for example, may be employed to review and approve one or more updates recommended by the automated action processor 330. The approved updates may be applied to the given machine learning model using a feedback path 350. For example, the updates may be directed to a given one of the portions of the given machine learning model developed in the model parameter development phase 312, the training process development phase 314 and the training dataset development phase 316, based on an evaluation of respective model parameter sub-score, the training process sub-score or the training dataset sub-score, as discussed above in conjunction with FIG. 2.

For example, the portion of the given machine learning model to be updated may correspond to a model parameter portion, a training process portion and/or a training dataset portion where the model agreement sub-score revealed a particular weakness based on a defined score offset, for example. If a particular training dataset receives a low training dataset sub-score, for example, the domain expert 340 may decide to address this situation by changing to a better scoring dataset or by attempting to further process the dataset with additional processing, balancing or augmenting techniques. Similarly, if a particular model parameter receives a low model parameter sub-score, decisions made in the model parameter development phase 312 can be reconsidered to improve the model parameter sub-score.

In this manner, actionable steps can be provided to improve the given machine learning model, for example, by improving the model parameters, the training process or the training dataset aspects of the machine learning model development pipeline 310.

In another embodiment, the automated action recommended by the automated action processor 330 may comprise generating a notification to an audit analyzer 360 in connection with an audit of the given machine learning model. For example, the audit may be performed in connection with legislation regarding the transparency, safety and/or reliability of machine learning models.

The automated action processor 330 may also be employed to select a given machine learning model for deployment based at least in part on the model agreement score, in a similar manner as described above in conjunction with FIG. 2.

FIG. 4 is a flow chart illustrating an exemplary implementation of a process 400 for evaluation of machine learning models using agreement scores, according to one embodiment of the disclosure. In the example of FIG. 4, the process 400 in step 402, obtains two or more of: (i) a first set of first quantitative feature values characterizing one or more model parameters of at least one machine learning model; (ii) a second set of second quantitative feature values characterizing a training process used to train the at least one machine learning model; and (iii) a third set of third quantitative feature values characterizing a training dataset used to train the at least one machine learning model.

A score is generated in step 404 based at least in part on an aggregation of at least portions of each of the two or more of: the first set, the second set and the third set, wherein the score is based at least in part on an agreement of the at least one machine learning model with one or more designated characteristics. In step 406, at least one automated action is initiated based at least in part on the score.

In some embodiments, the one or more first quantitative feature values characterizing one or more model parameters of the at least one machine learning model comprise one or more of: (i) a numeric adjustment to the score based at least in part on a degree of transparency of the at least one machine learning model for each of a plurality of different designated groupings of machine learning models; (ii) a numeric adjustment to the score based at least in part on whether the at least one machine learning model was deployed for a given task without incurring one or more designated bias issues; (iii) a numeric adjustment to the score based at least in part on whether the at least one machine learning model was previously at least partially trained using third-party data that is not accessible; and (iv) a numeric adjustment to the score based at least in part on whether the at least one machine learning model was developed at least partially by a third-party entity.

In one or more embodiments, the one or more second quantitative feature values characterizing the training process used to train the at least one machine learning model comprise one or more of: (i) a performance value of the at least one machine learning model following the training process; (ii) an overfit value characterizing a difference in: (a) a performance of the at least one machine learning model with respect to the training dataset and (b) a performance of the at least one machine learning model with respect to a testing dataset; and (iii) a numeric adjustment to the score for at least one of a plurality of different regularization techniques used by the training process.

In at least one embodiment, the one or more third quantitative feature values characterizing the training dataset used to train the at least one machine learning model comprise one or more of: (i) a balance value calculated using at least one designated balance metric that characterizes a degree of balance of the training dataset used to train the at least one machine learning model; (ii) a numeric adjustment to the score based on a presence of one or more personal human characteristics in the training dataset used to train the at least one machine learning model; and (iii) a numeric adjustment to the score based on an indication that at least a portion of the training dataset used to train the at least one machine learning model was obtained using an automated data mining technique.

In some embodiments, the at least one automated action may comprise initiating a generation of one or more updates to the at least one machine learning model based at least in part on the score. The one or more updates may be directed to at least a given one of the one or more model parameters, the training process and the training dataset of the at least one machine learning model based at least in part on an evaluation of a portion of the score generated from a corresponding one of the first quantitative feature values, the second quantitative feature values and the third quantitative feature values. The at least one automated action may also comprise (i) generating at least one notification in connection with at least one audit of the at least one machine learning model; and/or selecting a given one of a plurality of machine learning models for deployment based at least in part on the respective score.

The score may be generated before a deployment of the at least one machine learning model. The first quantitative feature values, the second quantitative feature values and/or the third quantitative feature values may be obtained from an instrumented development environment used in the creation of the at least one machine learning model.

The particular processing operations and other functionality described in conjunction with FIGS. 2 through 4, for example, are presented by way of illustrative example only, and should not be construed as limiting the scope of the disclosure in any way. Alternative embodiments can use other types of processing operations for evaluation of machine learning models using agreement scores. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for evaluation of machine learning models using agreement scores can be employed, for example, to detect unexpected behavior of a given machine learning model prior to a deployment of such a model. Among other benefits, the disclosed machine learning model evaluation techniques, in at least some embodiments, employ objective and quantitative assessment techniques and are not dependent on subjective judgement (e.g., that requires the availability of an expert); and can be based on features and other information automatically derived from existing information sources (thus, providing scalability benefits and permitting use in cases where the number of models is significant). In addition, the disclosed quantitative machine learning model evaluation techniques allow a bias or other unexpected behavior of a given machine learning model to be detected before the given machine learning model is deployed.

One or more embodiments of the disclosure provide improved methods, apparatus and computer program products for evaluation of machine learning models using agreement scores. The foregoing applications and associated embodiments should be considered as illustrative only, and numerous other embodiments can be configured using the techniques disclosed herein, in a wide variety of different applications.

It should also be understood that the disclosed machine learning model evaluation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for evaluation of machine learning models using agreement scores may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based machine learning model evaluation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based machine learning model evaluation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
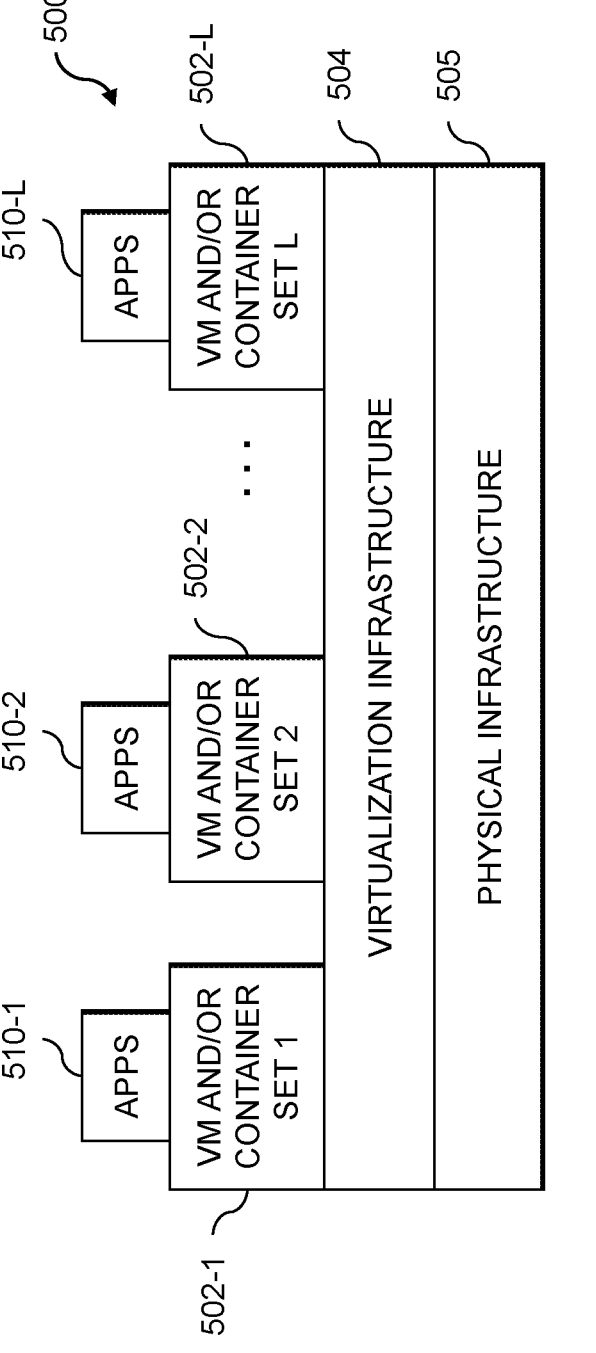
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide machine learning model evaluation functionality of the type described above for one or more processes running on a given one of the VMs. For example, each of the VMs can implement machine learning model evaluation control logic and associated score-based model processing functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide machine learning model evaluation functionality of the type described above for one or more processes running on different ones of the containers. For example, a container host device supporting multiple containers of one or more container sets can implement one or more instances of machine learning model evaluation control logic and associated score-based model processing functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
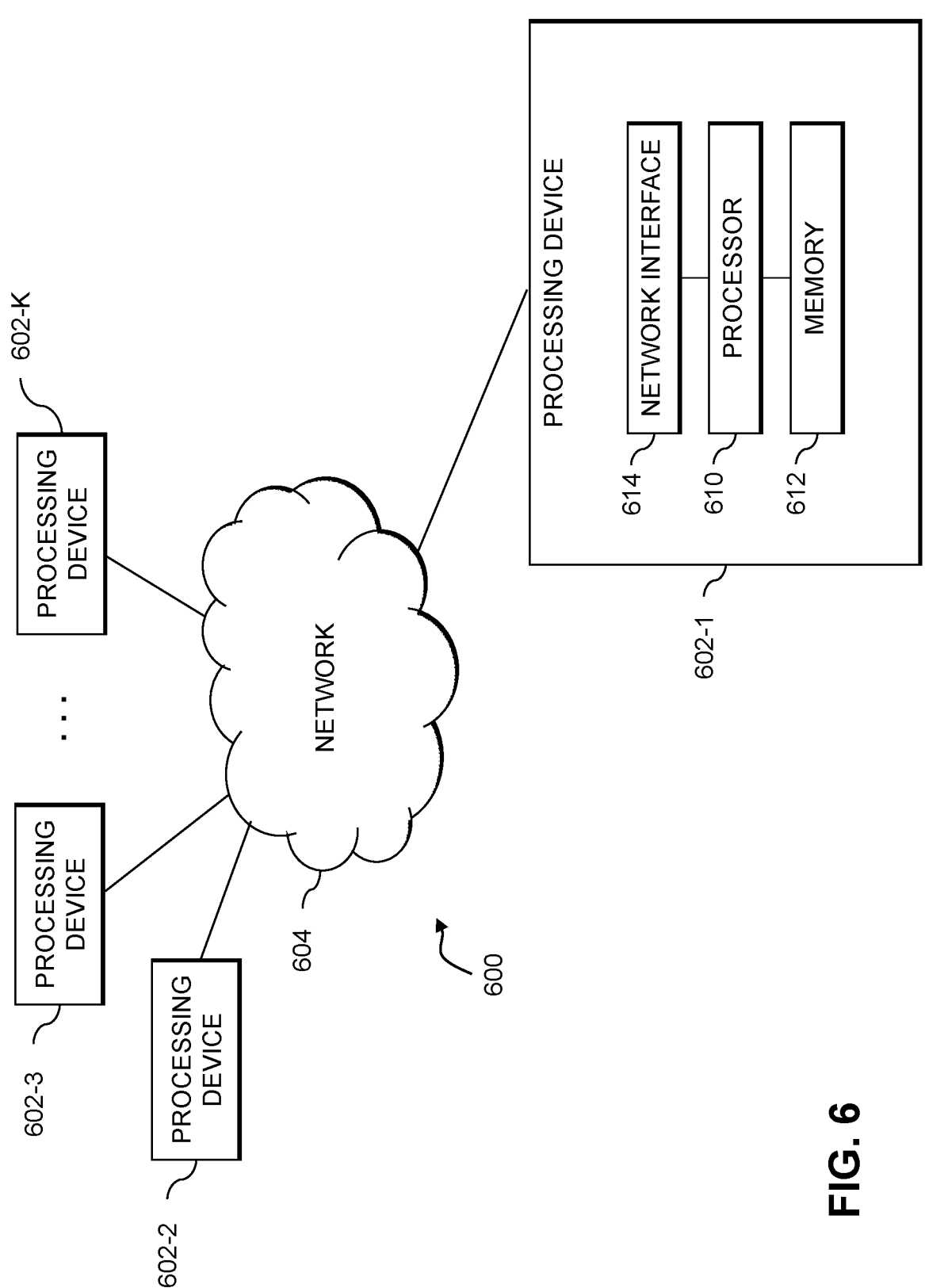
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only.

Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining two or more of: (i) a first set comprising one or more first quantitative feature values characterizing one or more model parameters of at least one machine learning model; (ii) a second set comprising one or more second quantitative feature values characterizing a training process used to train the at least one machine learning model; and (iii) a third set comprising one or more third quantitative feature values characterizing a training dataset used to train the at least one machine learning model;

generating a score based at least in part on an aggregation of at least portions of each of the two or more of: the first set, the second set and the third set, wherein the score is based at least in part on an agreement of the at least one machine learning model with one or more designated characteristics;

initiating at least one automated action based at least in part on the score, wherein the at least one automated action comprises updating at least a portion of the at least one machine learning model based at least in part on the score; and initiating a deployment of the updated at least one machine learning model;

wherein the method is performed by at least one processing device comprising a processor coupled to a memory.

2. The method of claim 1, wherein the score is generated before a deployment of the at least one machine learning model.

3. The method of claim 1, wherein the one or more first quantitative feature values characterizing the one or more model parameters of the at least one machine learning model comprise one or more of: (i) a numeric adjustment to the score based at least in part on a degree of transparency of the at least one machine learning model for each of a plurality of different designated groupings of machine learning models; (ii) a numeric adjustment to the score based at least in part on whether the at least one machine learning model was deployed for a given task without incurring one or more designated bias issues; (iii) a numeric adjustment to the score based at least in part on whether the at least one machine learning model was previously at least partially trained using third-party data that is not accessible; and (iv) a numeric adjustment to the score based at least in part on whether the at least one machine learning model was developed at least partially by a third-party entity.

4. The method of claim 1, wherein the one or more second quantitative feature values characterizing the training process used to train the at least one machine learning model comprise one or more of: (i) a performance value of the at least one machine learning model following the training process; (ii) an overfit value characterizing a difference in:

(a) a performance of the at least one machine learning model with respect to the training dataset and (b) a performance of the at least one machine learning model with respect to a testing dataset; and (iii) a numeric adjustment to the score for at least one of a plurality of different regularization techniques used by the training process.

5. The method of claim 1, wherein the one or more third quantitative feature values characterizing the training dataset used to train the at least one machine learning model comprise one or more of: (i) a balance value calculated using at least one designated balance metric that characterizes a degree of balance of the training dataset used to train the at least one machine learning model; (ii) a numeric adjustment to the score based on a presence of one or more personal human characteristics in the training dataset used to train the at least one machine learning model; and (iii) a numeric adjustment to the score based on an indication that at least a portion of the training dataset used to train the at least one machine learning model was obtained using an automated data mining technique.

6. The method of claim 1, further comprising obtaining at least one of the first quantitative feature values, the second quantitative feature values and the third quantitative feature values from an instrumented development environment used to create the at least one machine learning model.

7. The method of claim 1, wherein the at least one automated action comprises initiating a generation of one or more updates to at least a portion of the at least one machine learning model based at least in part on the score.

8. The method of claim 7, wherein the one or more updates are directed to at least a given one of the one or more model parameters, the training process and the training dataset of the at least one machine learning model based at least in part on an evaluation of a portion of the score generated from a corresponding one of the first quantitative feature values, the second quantitative feature values and the third quantitative feature values.

9. The method of claim 1, wherein the at least one automated action comprises generating at least one notification in connection with at least one audit of the at least one machine learning model.

10. The method of claim 1, wherein the at least one machine learning model comprises a plurality of machine learning models and wherein the at least one automated action comprises selecting a given one of the plurality of machine learning models for deployment based at least in part on the respective score.

11. An apparatus comprising:

at least one processing device comprising a processor coupled to a memory;

the at least one processing device being configured to implement the following steps:

obtaining two or more of: (i) a first set comprising one or more first quantitative feature values characterizing one or more model parameters of at least one machine learning model; (ii) a second set comprising one or more second quantitative feature values characterizing a training process used to train the at least one machine learning model; and (iii) a third set comprising one or more third quantitative feature values characterizing a training dataset used to train the at least one machine learning model;

generating a score based at least in part on an aggregation of at least portions of each of the two or more of: the first set, the second set and the third set, wherein the score is based at least in part on an agreement of the at least one machine learning model with one or more designated characteristics;

initiating at least one automated action based at least in part on the score, wherein the at least one automated action comprises updating at least a portion of the at least one machine learning model based at least in part on the score; and initiating a deployment of the updated at least one machine learning model.

12. The apparatus of claim 11, wherein the score is generated before a deployment of the at least one machine learning model.

13. The apparatus of claim 11, further comprising obtaining at least one of the first quantitative feature values, the second quantitative feature values and the third quantitative feature values from an instrumented development environment used to create the at least one machine learning model.

14. The apparatus of claim 11, wherein the at least one automated action comprises initiating a generation of one or more updates to at least a portion of the at least one machine learning model based at least in part on the score, and wherein the one or more updates are directed to at least a given one of the one or more model parameters, the training process and the training dataset of the at least one machine learning model based at least in part on an evaluation of a portion of the score generated from a corresponding one of the first quantitative feature values, the second quantitative feature values and the third quantitative feature values.

15. The apparatus of claim 11, wherein the at least one automated action comprises one or more of generating at least one notification in connection with at least one audit of the at least one machine learning model and selecting a given one of a plurality of machine learning models for deployment based at least in part on the respective score.

16. A non-transitory processor-readable storage medium having stored therein program code of one or more software programs, wherein the program code when executed by at least one processing device causes the at least one processing device to perform the following steps:

obtaining two or more of: (i) a first set comprising one or more first quantitative feature values characterizing one or more model parameters of at least one machine learning model; (ii) a second set comprising one or more second quantitative feature values characterizing a training process used to train the at least one machine learning model; and (iii) a third set comprising one or more third quantitative feature values characterizing a training dataset used to train the at least one machine learning model;

generating a score based at least in part on an aggregation of at least portions of each of the two or more of: the first set, the second set and the third set, wherein the score is based at least in part on an agreement of the at least one machine learning model with one or more designated characteristics;

initiating at least one automated action based at least in part on the score, wherein the at least one automated action comprises updating at least a portion of the at least one machine learning model based at least in part on the score; and initiating a deployment of the updated at least one machine learning model.

17. The non-transitory processor-readable storage medium of claim 16, wherein the score is generated before a deployment of the at least one machine learning model.

18. The non-transitory processor-readable storage medium of claim 16, further comprising obtaining at least one of the first quantitative feature values, the second quantitative feature values and the third quantitative feature values from an instrumented development environment used to create the at least one machine learning model.

19. The non-transitory processor-readable storage medium of claim 16, wherein the at least one automated action comprises initiating a generation of one or more updates to at least a portion of the at least one machine learning model based at least in part on the score, and wherein the one or more updates are directed to at least a given one of the one or more model parameters, the training process and the training dataset of the at least one machine learning model based at least in part on an evaluation of a portion of the score generated from a corresponding one of the first quantitative feature values, the second quantitative feature values and the third quantitative feature values.

20. The non-transitory processor-readable storage medium of claim 16, wherein the at least one automated action comprises one or more of generating at least one notification in connection with at least one audit of the at least one machine learning model and selecting a given one of a plurality of machine learning models for deployment based at least in part on the respective score.

* * * * *